(12) United States Patent
Liu

(10) Patent No.: US 11,575,611 B2
(45) Date of Patent: *Feb. 7, 2023

(54) QUALITY OF SERVICE IN PACKET NETWORKS

(71) Applicant: Comcast Cable Communications, LLC, Philadelphia, PA (US)

(72) Inventor: Chia J. Liu, Marlton, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/010,396

(22) Filed: Sep. 2, 2020

(65) Prior Publication Data

US 2021/0021531 A1 Jan. 21, 2021

Related U.S. Application Data

(63) Continuation of application No. 15/496,561, filed on Apr. 25, 2017, now Pat. No. 10,798,010, which is a
(Continued)

(51) Int. Cl.
*H04L 12/857* (2013.01)
*H04L 47/2491* (2022.01)
(Continued)

(52) U.S. Cl.
CPC .......... *H04L 47/2491* (2013.01); *H04L 47/17* (2013.01); *H04L 47/18* (2013.01); *H04L 47/2408* (2013.01); *H04L 47/2433* (2013.01)

(58) Field of Classification Search
CPC ..... H04L 47/2408; H04L 47/17; H04L 47/18; H04L 47/2433; H04L 47/2491
See application file for complete search history.

(56) References Cited

U.S. PATENT DOCUMENTS 7,684,391 B2 3/2010 Liu
7,697,422 B1 4/2010 Arad et al.
(Continued)

FOREIGN PATENT DOCUMENTS

EP 1 638 262 A1 3/2006

OTHER PUBLICATIONS

Dec. 9, 2020—Canadian Office Action—CA 2,773,885.
(Continued)

*Primary Examiner* — Mansour Oveissi
*Assistant Examiner* — David M Oveissi
(74) *Attorney, Agent, or Firm* — Banner & Witcoff, Ltd.

(57) ABSTRACT

Methods and systems for providing quality of service over IP networks are disclosed. In one aspect, a flow label field of a header may be divided into first and second portions. The first portion defines a quality of service. The second portion identifies a message flow. Once the first portion defining the quality of service is established by the sending node, no nodes in the transmission path may change the quality of service value. Each node may route packets based on the quality of service field, or may modify the traffic class field of the header based on the quality of service and then route the packet based on the traffic class field. The QoS field can be used to complement a DSCP/traffic class field and provide a better mechanism for end-to-end QoS using IPv6. A service provider can use DSCP within its own administrative domain(s), and end users can set and maintain QoS using the methods described herein, thereby providing a framework for end-to-end QoS using IP packets.

20 Claims, 4 Drawing Sheets

Related U.S. Application Data continuation of application No. 14/630,749, filed on Feb. 25, 2015, now Pat. No. 9,667,555, which is a continuation of application No. 13/270,031, filed on Oct. 10, 2011, now Pat. No. 8,989,029, which is a continuation-in-part of application No. 13/157,756, filed on Jun. 10, 2011, now abandoned.

(51) Int. Cl.
  *H04L 47/10* (2022.01)
  *H04L 47/2408* (2022.01)
  *H04L 47/2425* (2022.01)
  *H04L 47/17* (2022.01)

(56) References Cited

U.S. PATENT DOCUMENTS

| | | |
|---|---|---|
| 2003/0026241 A1 | 2/2003 | Ono et al. |
| 2003/0204596 A1 | 10/2003 | Yadav |
| 2004/0008689 A1 | 1/2004 | Westphal et al. |
| 2004/0125797 A1 | 7/2004 | Raisanen |
| 2004/0156341 A1 | 8/2004 | Cheng et al. |
| 2005/0099949 A1 | 5/2005 | Mohan et al. |
| 2006/0088034 A1 | 4/2006 | Santitoro |
| 2006/0120288 A1 | 6/2006 | Masseur et al. |
| 2006/0182127 A1 | 8/2006 | Park |
| 2007/0165668 A1* | 7/2007 | Liu .............. H04L 47/2433 370/466 |
| 2007/0201366 A1 | 8/2007 | Liu |
| 2010/0290485 A1 | 11/2010 | Martini et al. |
| 2011/0004866 A1 | 1/2011 | Frost |
| 2011/0078783 A1 | 3/2011 | Duan et al. |
| 2011/0299414 A1 | 12/2011 | Yu et al. |

OTHER PUBLICATIONS

Rajahalme, et al., "IPv6 Flow Label Specification", RFC3697, Mar. 2004, 9 pages.
European Search Report—EP 12163157.6—dated Sep. 20, 2012.
Feb. 27, 2018—Canadian Office Action—CA 2,773,885.
Feb. 26, 2019—Canadian Office Action—CA 2,773,885.
Jan. 31, 2020—Canadian Office Action—CA 2,773,885.
Nov. 24, 2021—Canadian Office Action—CA 2,773,885.

* cited by examiner

QUALITY OF SERVICE IN PACKET NETWORKS

CROSS-REFERENCE TO RELATED APPLICATIONS

This present application is a continuation of U.S. application Ser. No. 15/496,561, filed Apr. 25, 2017, and having the title "Quality of Service in Packet Networks", which is a continuation of U.S. application Ser. No. 14/630,749, now U.S. Pat. No. 9,667,555, filed Feb. 25, 2015, and having the title "Quality of Service in Packet Networks", which is a continuation of U.S. application Ser. No. 13/270,031, now U.S. Pat. No. 8,989,029, filed Oct. 10, 2011, and having the title "Quality of Service in Packet Networks", which is a continuation-in-part of U.S. application Ser. No. 13/157,756, filed Jun. 10, 2011, and having the title "Immutable Quality of Service in Packet Networks," each of which is herein incorporated by reference in its entirety for all purposes.

FIELD

Aspects described herein relate generally to Quality of Service (QoS) in networks. Some aspects relate to end-to-end QoS in IP networks, irrespective of whether a data packet stays within a single network or traverses multiple networks that use different QoS rules.

BACKGROUND

In packet switched networks such as the Internet, Quality of Service (QoS) generally refers to the ability to provide different priority to different applications, users, or data flows, or to guarantee a certain level of performance to a data flow. For example, a required bit rate, delay, jitter, packet dropping probability and/or bit error rate may be guaranteed for a particular application. Quality of service guarantees may be important if, for example, network capacity is limited and in particular for real-time streaming multimedia applications such as voice over IP (VoIP), online games and IP-TV, because these often require a minimum fixed bit rate and are delay sensitive. QoS may also be needed in networks where bandwidth is a limited resource, for example in cellular data communication. This disclosure is directed to improving QoS in networks.

BRIEF SUMMARY

The following presents a simplified summary in order to provide a basic understanding of some aspects described herein. This summary is not an extensive overview. It is not intended to identify key or critical elements of the disclosure or to delineate the scope of the disclosure. The following summary merely presents some concepts in a simplified form as a prelude to the more detailed description provided below.

Aspects are directed to techniques for providing immutable quality of service over network, for example IPv6 networks. A flow label field of an IPv6 header may be divided into first and second portions. The first portion is a new header field that defines a quality of service specified by the user or other packet source. The second portion replaces the now existing flow label field and identifies a message flow as specified in RFC 3697, with the exception that the field length is shorter (the total length of the new quality of service field and the revised flow label field is the same length as the flow label field specified in RFC 2460, Internet Protocol version 6 Specification). Once the first portion defining the quality of service is established by the sending node, no nodes in the transmission path are permitted to change the quality of service value. Each time the packet enters a new administrative domain (each administrative domain may be managed by the same or a different network operator) the traffic class field may be set based on the quality of service policies of that administrative domain. Each node may treat (e.g., route) IPv6 packets based on the quality of service field or traffic class field alone, or may modify the traffic class field of the IPv6 header based on the new quality of service field and then route the packet to a next hop or destination based on the traffic class field. Other packet data and header data may also be taken into account in any routing decision.

A first aspect provides a new data structure defining an Internet Protocol (IP) header. The data structure may have a first data field consisting of 4 bits defining a version of the Internet Protocol; a second data field that may consist of 8 bits defining a traffic class; a third data field defining an immutable quality of service; a fourth data field defining a flow label; a fifth data field that may consist of 16 bits defining a payload length; a sixth data field that may consist of 8 bits defining a next header; a seventh data field that may consist of 8 bits defining a hop limit; an eighth data field that may consist of 128 bits defining a source address; and a ninth data field that my consist of 128 bits defining a destination address. The third and fourth data fields, combined, may consist of 20 bits. Once the value of the third data field is established, that value should never be changed by any node in the transmission path of the packet. The third data field (formerly a portion of the flow label) defining an immutable quality of service can be used to complement DSCP and make DSCP a better mechanism for end-to-end Quality of Service (QoS), e.g., in Internet Protocol networks such as those that use IPv6. DSCP bits may be set by service providers, whereas packet senders (e.g., users, source applications, etc.) set the Quality of Service and Flow Label fields, thereby providing a framework for end-to-end QoS.

A second aspect provides an apparatus including a processor and a memory. The memory stores computer executable instructions that, when executed by the processor, cause the apparatus to receive an Internet Protocol data packet and routing the IP data packet to a next hop based on header contents of the IP data packet when the apparatus received the IP packet from inside an administrative domain of the apparatus. When the apparatus received the IP data packet from outside the administrative domain of the apparatus, the apparatus may determine a traffic class of the data packet based on a quality of service identified in a first portion of a flow label field in the header contents of the IP data packet, update the IP data packet by inserting the traffic class into a traffic class field of the header of the IP data packet, and treat the updated IP data packet to a next hop based on the updated header contents of the IP data packet.

A third aspect describes a method that includes receiving, at a routing node in a packet switched network, an Internet Protocol data packet, and routing, by the routing node, the IP data packet to a next hop based on header contents of the IP data packet when the routing node received the IP data packet from a previous hop node within a same administrative domain as the routing node. The method may further include, when the routing node received the IP data packet from a previous hop node not within the same administrative domain as the routing node, determining a traffic class of the IP data packet based on a quality of service identified in a first portion of a flow label field in the header contents of the IP data packet, updating the IP data packet by inserting the traffic class into a traffic class field of the header of the IP data packet, and treating, by the routing node, the updated IP data packet based on the updated header contents of the IP data packet and preconfigured traffic class per-hop behavior.

BRIEF DESCRIPTION OF THE DRAWINGS

A more complete understanding of the disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope of the disclosure. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Packet-switched data commonly traverses multiple network service operators' networks between the origin and destination of each packet. Network operators may include any company that manages a physical network over which Internet Protocol traffic may be sent, e.g., including but not limited to Internet multi-service operators, wireless and mobile-to-mobile service operators, as well as other Internet service providers. These operators may be referred to herein generically as an Internet Service Provider (ISP) or network operator (NO), and reference to one does not exclude the other.

Figure 1:
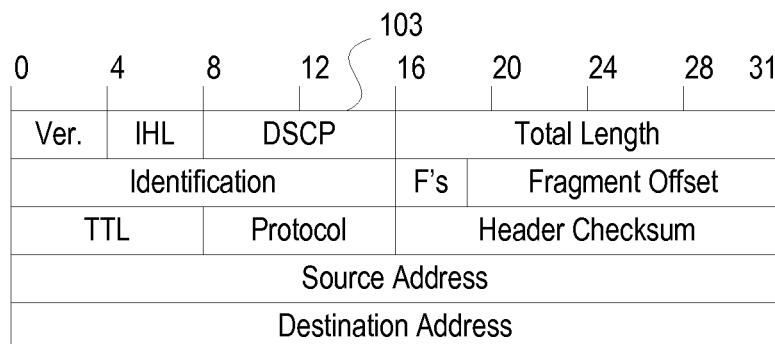
FIG. 1 illustrates a packet header according to IPv4.
Figure 2:
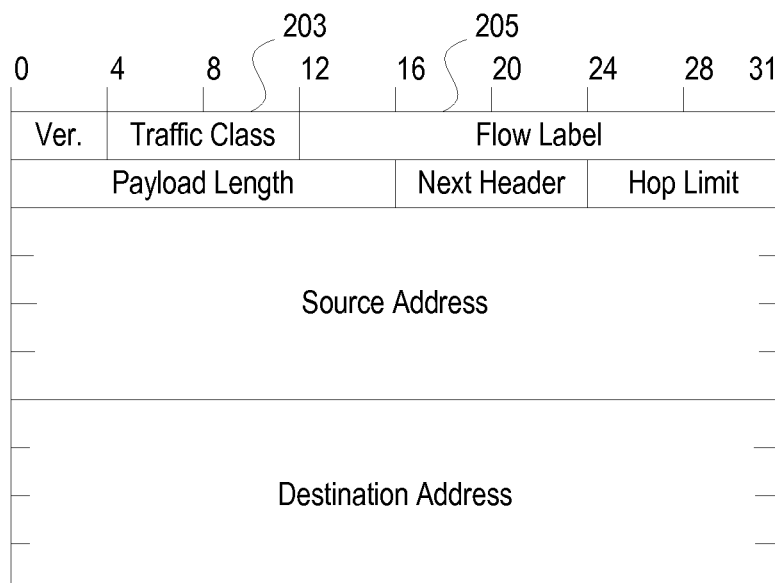
FIG. 2 illustrates a packet header according to IPv6.

Every ISP may manage QoS in a different manner FIG. 1 illustrates a typical packet header 101 for the original Internet Protocol, commonly referred to as IPv4. Header 101 includes, among other fields, a Differentiated Services Code Point (DiffServ, or DSCP) field 103. DSCP field 103 is now defined by RFC 2474, "Definition of the Differentiated Services Field (DS Field) in the IPv4 and IPv6 Headers." FIG. 2 illustrates a packet header 201 for IPv6 protocol. Header 201 includes a traffic class field 203, which is also defined by RFC 2474. Each of fields 103 and 203 are 8 bits in length. IPv6 headers are defined by RFC 2460, "Internet Protocol, Version 6 (Specification)."

As indicated in RFC 2474, differentiated services enhancements to the Internet protocol are intended to enable scalable service discrimination in the network without the need for per-flow state and signaling at every hop. A variety of services may be built from a small, well-defined set of building blocks which are deployed in network nodes. The services may be either end-to-end or intra-domain; they include both those that can satisfy quantitative performance requirements (e.g., peak bandwidth) and those based on relative performance (e.g., "class" differentiation). However, current solutions refer only to a single network operator at a time. For example, RFC 2474 describes how individual NOs can use DSCP to perform QoS within its own network, but makes no mention of how to maintain QoS across multiple NOs. Indeed, RFC 2474 contemplates setting bits in an IP header field at network boundaries (autonomous system boundaries, internal administrative boundaries, or hosts); using those bits to determine how packets are forwarded by the nodes inside the network, and conditioning the marked packets at network boundaries in accordance with the requirements or rules of each service. RFC 2474 does not contemplate source to destination QoS when data packets must traverse multiple network operators.

IPv6 header 201 also includes a flow label field 205. Flow label 205 is governed by RFC 3697, "IPv6 Flow Label Specification." RFC 3697 specifies the IPv6 Flow Label field and the minimum requirements for IPv6 source nodes labeling flows, IPv6 nodes forwarding labeled packets, and flow state establishment methods. A flow is a sequence of packets sent from a particular source to a particular unicast, anycast, or multicast destination that the source desires to label as a flow. A flow could consist of all packets in a specific transport connection or a media stream. However, a flow is not necessarily 1:1 mapped to a transport connection. Thus, while a flow label may identify all packets that may be treated as part of the same connection, the flow label does not specify or indicate how those packets should be treated with respect to QoS.

Each network operator and/or business network has its own service/traffic class identification and unique Traffic Class/DSCP mapping. Due to different DSCP mappings by different network operators for the same type of service, uniform QoS cannot be guaranteed across network boundaries. For example, Traffic Class 46 may be reserved for voice bearer traffic and hence get the best treatment by a first network operator. However, Traffic Class 46 might refer or map to a 'best effort' class of traffic by a second network operator. When a packet bearing Traffic Class 46 crosses from the first to the second network operator, the packet may get dropped or delayed based on a then current condition of network congestion within the second network operator's network, because the second network operator is treating the packet with "best effort" quality of service instead of the originally intended "best treatment" quality of service.

As another example, assume that first and second NOs each feed traffic to a third network operator (NO-3 is said to have peering with each of NO-1 and NO-2). Further assume that NO-1 uses Traffic Class 46 for VoIP (best treatment) and Traffic Class 40 for best effort (BE) data, and that NO-2 uses Traffic Class 40 for VoIP (best treatment), and Traffic Class 46 for BE data. NO-3 must treat both Traffic Classes 40 and 46 in its Expedited Forwarding (EF) priority queue, defined in RFC2598, to satisfy interconnect agreements with both NO-1 and NO-2. Thus, best effort data traffic from both NO-1 and NO-2 gets preferential treatment by NO-3 for free, whereas NO-3 will be burdened by carrying a larger volume of traffic in its priority queue, making capacity management for NO-3 difficult and costly.

Figure 3:
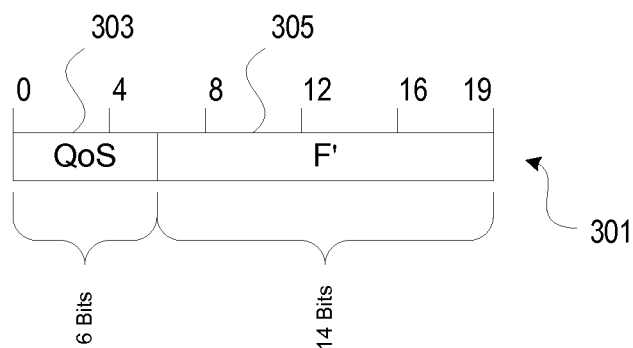
FIG. 3 illustrates a modified Flow Label header according to one or more illustrative aspects described herein.

Aspects of end-to-end QoS treatment were previously available only in a single administration network domain, e.g., within a single network operator's network, because for example, DSCP markings may be altered when a packet crosses a network boundary, and it is not always possible to restore a previous DSCP marking once the DSCP value has been changed. With reference to FIG. 3, in order to achieve end-to-end Quality of Service (QoS) between a source and a destination over a packet switched data path that traverses multiple networks or network operators, aspects described herein use a method for keeping QoS attributes constant as a packet travels across network boundaries. In one aspect, such can be achieved via a modified flow label 301. Modified flow label 301 may be, for example, divided into two sections: QoS field 303 (6 bits) and (flow-prime) field 305 (14 bits). The division of modified DSCP field 301 may be other than 6-bits/14-bits, but this division is a satisfactory example for the aspects described herein. New QoS field 303 is defined and managed as described herein. F field 305 may be defined and managed according to a standard such as RFC 3697, as is flow label 205, except that the field may be limited to 14 bits (or however many bits are allocated to F).

According to aspects described herein, QoS field 303 is immutable, i.e., once a source node, for example, sets or defines QoS field 303, that field cannot be modified by any other node or during any hop between the source and the destination specified in the packet header. Customer, user, provider or peer traffic QoS information is thereby preserved end-to-end when a packet is sent from a source to a destination address. The value of the QoS field 303 may be selected by a source node based on a desired QoS. In this illustrative example, QoS field 303 is 6 bits in length, and can therefore distinguish between 64 different qualities of service. The valid values of the QoS field and their respective meanings may be preferably agreed upon as a standard by network operators, e.g., through a standard to be set by the Internet Engineering Task Force (IETF) or the Internet Assigned Numbers Authority (IANA). Alternatively, a translation system can be set up to correspond the values of the QoS field into a common set of values. Each QoS value may have different requirements with respect to QoS factors such as throughput, dropped packets, errors, latency, jitter, and ordered delivery. How a node "treats" a packet (or "treating a packet") refers to how the node handles or manages the packet with respect to one or more of these QoS factors before routing or forwarding to a next hop.

Throughput refers to the minimum guaranteed bit rate that will be provided to a given data stream. Dropped packets refers to whether a router can fail to deliver (drop) some packets if data is corrupted or if packets arrive when a router's buffers is already full, or whether a router must retransmit until a packet is successfully received by the next hop/node. Errors refers to a scenario where packets are corrupted due to bit errors caused by noise or interference (e.g., in wireless communications and long copper wires), and whether the receiver should detect this and ask for the packet to be retransmitted. Latency refers to the amount of time it takes for a packet to reach its destination. Latency is different from throughput, as the delay can build up over time, even if the throughput is almost normal. In some cases, excessive latency can render an application such as VoIP or online gaming unusable. Jitter refers to packets from the source reaching the destination with different delays. A packet's delay varies with its position in the queues of the routers along the path between source and destination and this position can vary unpredictably. This variation in delay is known as jitter and can seriously affect the quality of streaming audio and/or video. Ordered delivery refers to whether packets should arrive at a destination in a same order as they were sent by a source. Out of order delivery requires special additional protocols responsible for rearranging out-of-order packets to an isochronous state once they reach their destination. This can be especially important for video and VoIP streams where quality is dramatically affected by both latency and lack of sequence.

Table 1, below, illustrates possible QoS values that may be used, and their respective meaning.

TABLE 1

| | | QoS Values | | | | |
|---|---|---|---|---|---|---|
| Value | Throughput | Dropped Packets | Errors | Latency | Jitter | Ordered Delivery |
| 0 | Best Effort | Ok | Ok | Ok | Ok | Not Required (false) |
| 1 | >t1 | <d1 | <e1 | <l1 | <j1 | True/False (as chosen by ISP) |
| ... | ... | ... | ... | ... | ... | ... ... |
| 62 | >t62 | <d62 | <e62 | <l62 | <j62 | T/F (as chosen by ISP) |
| 63 | >t63 | <d63 | <e63 | <l63 | <j63 | T/F (as chosen by ISP) |

The values of t, d, e, 1, and j may be agreed upon or be set by network operators or a standards-making body, such as the Internet Engineering Task Force (IETF).

Figure 4:
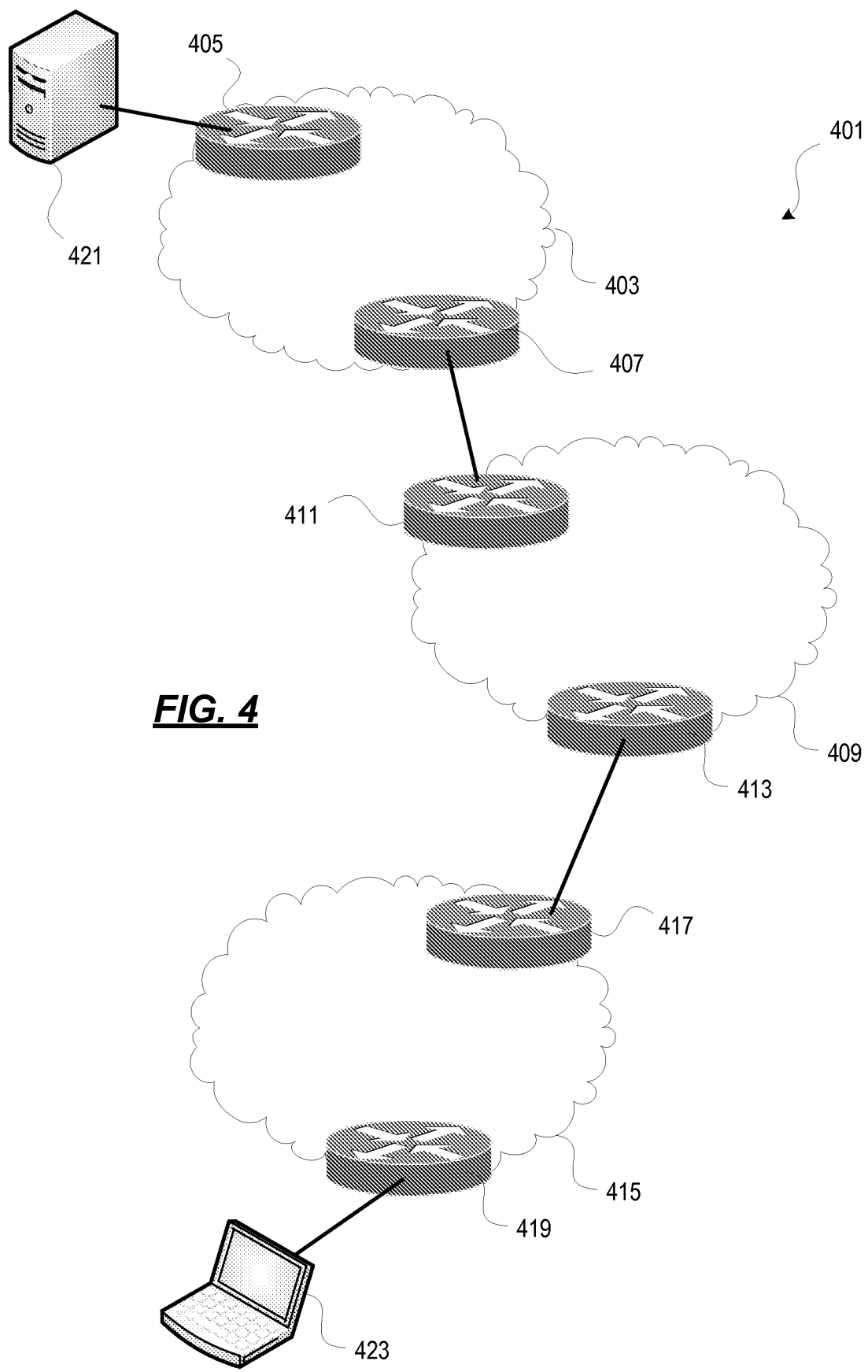
FIG. 4 illustrates a network architecture according to one or more illustrative aspects described herein.

FIG. 4 illustrates an example architecture 401 that may be used according to one or more aspects described herein. Architecture 401 shows an example of three network operators 403, 409, 415. Alternatively elements 403, 409 and 415 may be networks operated by the same operator. NO 403 may include two edge routers 405, 407. NO 409 may include two edge routers 411, 413. NO 415 may include two edge routers 417, 419. Endpoints 421, 423 may each comprise any data processing device capable of sending and/or receiving IP data including, but not limited to, user or network devices such as computers, servers, set top boxes, intelligent appliances, and mobile devices, among others. Each cloud 403, 409, 415 may also represent different networks or administrative domains, two or more of which may be operated by the same network operator or service provider.

Figure 5:
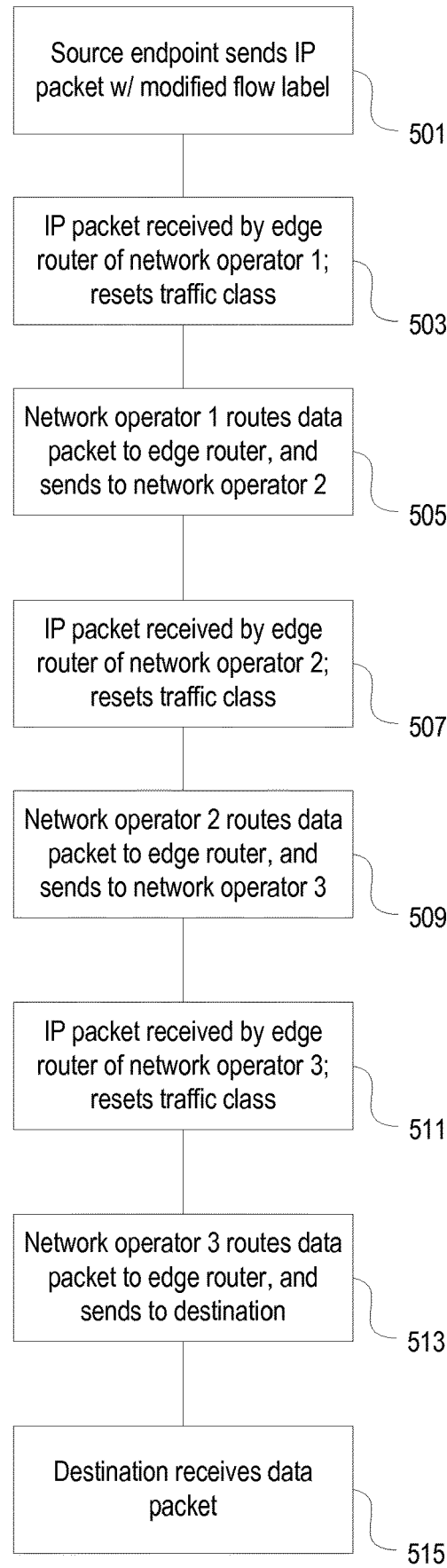
FIG. 5 illustrates a method of forwarding IPv6 data packets according to one or more illustrative aspects described herein.

FIG. 5 illustrates a method of transmitting data according to one or more illustrative aspects, using architecture 401 or other architectures. Initially, in step 501, source endpoint 421 (e.g., a server, user device, etc.), sends an IP packet (e.g., an IPv6 packet) having modified flow label 301 as shown in FIG. 3. Source endpoint 421 may populate the QoS field 303 based on the traffic category of the packet content, e.g., based on whether the packet's flow is messaging, voice, signaling, broadcast video, unicast video, etc. The value populated in QoS field 303 may be chosen, e.g., from Table 1, or be based on any other adopted standard or network operator's preference.

In step 503 the data packet is received by a first hop device, e.g., edge router 405. Edge router 405 is the first node within network 403 to receive the packet, and thus may set the traffic class (DSCP marking) internal to the network 403, for example, based on the first 6 bits of the modified flow label 301, e.g., based on the QoS field 303. In step 505 operator of network 403, such as network operator 1, routes the data packet internally within the network until the data packet is ultimately sent from network 1's edge router 407 to network operator 2's edge router 411 (or, for example, a different network of operator 1).

In step 507, edge router 411 receives the data packet. Being the first node within network operator 2's domain receiving the data packet, edge router 411 may reset the Traffic Class field based on network operator 2's own QoS policy and mappings for proper packet queuing treatment and drop profile, based on QoS field 303. In step 509 network operator 2 routes the data packet internally within its network until the data packet is ultimately sent from network operator 2's edge router 413 to network operator 3's edge router 417.

In step 511, edge router 417 receives the data packet. Being the first node within network operator 3's domain receiving the data packet, edge router 417 may reset the Traffic Class field (IPv6) based on network operator 3's own QoS policy and mappings for proper packet queuing treatment and drop profile, based on QoS field 303. In step 513 network operator 3 routes the data packet internally within its network until the data packet is ultimately sent from network operator 3's edge router 419 to destination endpoint 423. In step 515, the IP data packet is received by destination endpoint 423. As discussed above with reference to FIG. 4, two or more administrative domains may be under the control or management of a same or different network operator(s). For example, steps 505, 509, and 513 may involve routing between networks or administrative domains of the same operator or provider. In addition, although FIG. 5 and associated text have been described with respect to networks operated by different network operators, the disclosure is applicable to various networks of the same network operator that may implement, for example, different QoS policies and/or settings.

During the transmission of each IP packet according to aspects described herein, the source sets the value of the QoS field 303, based on an agreed upon standard. According to an aspect, no device in a packet's network path is allowed to change, for example, the first 6 bits (or other bits designated for QoS field 303) of the flow label in the IPv6 packet header. According to this aspect, the QoS field 303 is made immutable. The immutability of the QoS field 303 is consistent, for example, with RFC 3697 that all bits of the flow label should be immutable. Where an implementation cannot guarantee that the entire flow label will remain unchanged, that implementation should at least guarantee that the QoS field 303 portion of the modified flow label will remain unchanged. The portion of the modified flow label apportioned to F' 305 is assigned, for example, based on RFC 3697, namely, assigned a different flow value for different flows within the same QoS service category from the same source. Using aspects described herein enables end-to-end QoS treatment and will facilitate the delivery of IP data, IP voice and a IP video delivery across administrative network boundaries, without interfering with previous uses of the flow label field (a field which is presently not widely used).

Figure 6:
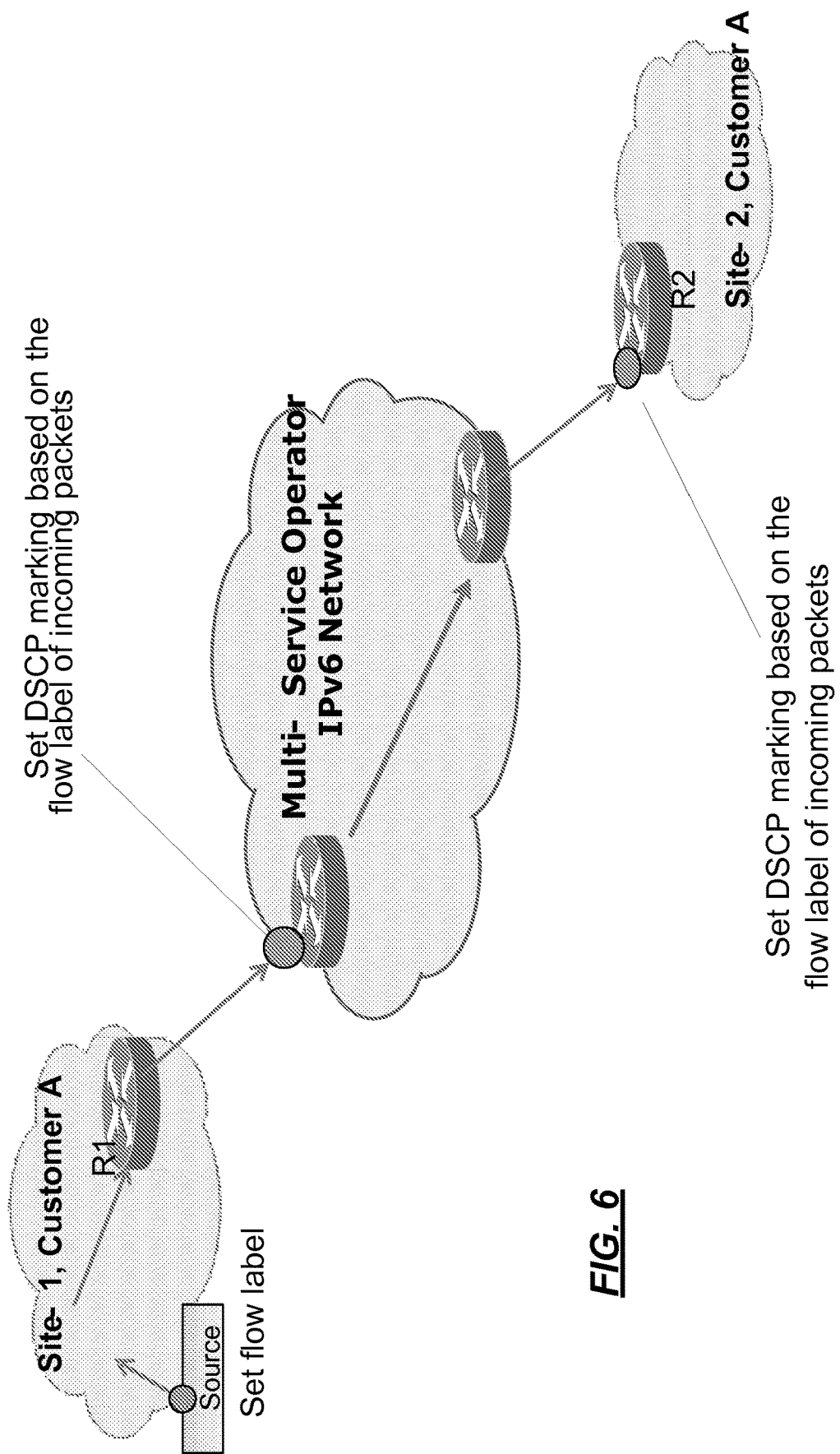
FIG. 6 illustrates an example for resetting the traffic class field when a packet enters new administrative domains.

As shown in FIG. 6, using aspects described herein, a source node sets the QoS field 303 in a modified flow label 301 of a packet such as an IPv6 packet. Each time that packet enters a new administrative domain—e.g., a separate network under control of the same or a different operator—the network operator resets the DSCP (Traffic Class) based on the QoS field 303 of the modified flow label 301. The traffic class bits can thus be set differently for each network. The QoS field of the modified flow label, however, remains the same across all network operators or networks because the immutable QoS field (e.g., first 6 bits) of the flow label preserves the desired QoS information to downstream network operators or networks.

As indicated above, according to an illustrative aspect the QoS field 303 may be 6 bits in length, and the F' field 305 may be 14 bits in length. Table 2, below, identifies alternative field sizes according to one or more other illustrative aspects.

TABLE 2

| Variant | QoS length | F' Length |
| --- | --- | --- |
| 1 | 1 | 19 |
| 2 | 2 | 18 |
| 3 | 3 | 17 |
| 4 | 4 | 16 |
| 5 | 5 | 15 |
| 6 | 6 | 14 |
| 7 | 7 | 13 |
| 8 | 8 | 12 |
| 9 | 9 | 11 |
| 10 | 10 | 10 |
| 11 | 11 | 9 |
| 12 | 12 | 8 |
| 13 | 13 | 7 |
| 14 | 14 | 6 |
| 15 | 15 | 5 |
| 16 | 16 | 4 |
| 17 | 17 | 3 |
| 18 | 18 | 2 |
| 19 | 19 | 1 |

Variant 6 is used as an example in this disclosure. However, of the variations shown in Table 2, any variant that provides a sufficient number of distinct levels of quality of service, as well as provides a sufficient number of available flow identifiers, is preferred.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a tangible computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
   receiving, by a first node of a plurality of nodes of a network, a data packet comprising a header that comprises:
     a quality of service data field, populated by a source node of the data packet, that indicates a quality of service for the data packet, wherein the quality of service data field comprises a first value that is not changed during transmission via the plurality of nodes; and
     a traffic class data field that is based on the quality of service, wherein the traffic class data field comprises a second value;
   based on a determination that the data packet was received from outside the network and that the second value was used outside the network, updating, based on the quality of service, the traffic class data field to comprise a third value different from the first value and the second value; and
   sending, based on the updated traffic class data field, the data packet to a next node of the plurality of nodes.

2. The method of claim 1, wherein the updating the traffic class data field is based on a mapping of quality of service to traffic class.

3. The method of claim 2, wherein the mapping is based on the network and is different from a second mapping of quality of service to traffic class used outside the network.

4. The method of claim 1, wherein the data packet further comprises a data field indicating one or more of:
   a protocol version,
   a flow label,
   a payload length,
   a next header,
   a hop limit,
   a source address, or
   a destination address.

5. The method of claim 1, wherein the quality of service data field of the data packet received by the first node and the quality of service data field of the data packet sent to the next node indicate the same quality of service.

6. The method of claim 1, wherein the data packet comprises an Internet Protocol (IP) data packet.

7. The method of claim 1, wherein the quality of service data field indicates acceptable levels of two or more of throughput, dropped packets, errors, latency, jitter, or ordered delivery.

8. An apparatus, associated with a network, comprising:
   one or more processors; and
   memory storing instructions that, when executed by the one or more processors, cause the apparatus to:
     receive, from outside the network, a data packet comprising a header that comprises:
       a quality of service data field, populated by a source node of the data packet, that indicates a quality of service for the data packet, wherein the quality of service data field comprises a first value that is not changed during transmission within the network; and
       a traffic class data field that is based on the quality of service, wherein the traffic class data field comprises a second value;
     based on a determination that the data packet was received from outside the network and that the second value was used outside the network, update, based on the quality of service, the traffic class data field to comprise a third value different from the first value and the second value; and
     send, based on the updated traffic class data field, the data packet to a next node.

9. The apparatus of claim 8, wherein the instructions, when executed by the one or more processors, cause the apparatus to update the traffic class data field based on a mapping of quality of service to traffic class.

10. The apparatus of claim 9, wherein the mapping is based on the network and is different from a second mapping of quality of service to traffic class used outside the network.

11. The apparatus of claim 8, wherein the data packet further comprises a data field indicating one or more of:
   a protocol version,
   a flow label,
   a payload length,
   a next header,
   a hop limit,
   a source address, or
   a destination address.

12. The apparatus of claim 8, wherein the quality of service data field of the data packet received by the apparatus and the quality of service data field of the data packet sent to the next node indicate the same quality of service.

13. The apparatus of claim 8, wherein the data packet comprises an Internet Protocol (IP) data packet.

14. The apparatus of claim 8, wherein the quality of service data field indicates acceptable levels of two or more of throughput, dropped packets, errors, latency, jitter, or ordered delivery.

15. A system comprising:
   a first node and a second node;
   wherein the first node is associated with a network and comprises:
     one or more first processors; and
     first memory storing first instructions that, when executed by the one or more first processors, cause the first node to:
       receive, from outside the network, a data packet comprising a header that comprises:
         a quality of service data field, populated by a source node of the data packet, that indicates a quality of service for the data packet, wherein the quality of service data field comprises a first value that is not changed during transmission within the network; and
         a traffic class data field that is based on the quality of service,
       wherein the traffic class data field comprises a second value;
       based on a determination that the data packet was received from outside the network and that the second value was used outside the network, update, based on the quality of service, the traffic class data field to comprise a third value different from the first value and the second value; and send, based on the updated traffic class data field, the data packet to a next node; and wherein the second node is associated with the network and comprises:

one or more second processors; and second memory storing second instructions that, when executed by the one or more second processors, cause the second node to:

receive the data packet.

16. The system of claim 15, wherein the first instructions, when executed by the one or more first processors, cause the first node to update the traffic class data field based on a mapping of quality of service to traffic class.

17. The system of claim 16, wherein the mapping is based on the network and is different from a second mapping of quality of service to traffic class used outside the network.

18. The system of claim 15, wherein the source node is located outside the network.

19. The system of claim 15, wherein the data packet comprises an Internet Protocol (IP) data packet.

20. The system of claim 15, wherein the quality of service data field indicates acceptable levels of two or more of: throughput, dropped packets, errors, latency, jitter, or ordered delivery.

* * * * *

UNITED STATES PATENT AND TRADEMARK OFFICE
CERTIFICATE OF CORRECTION

PATENT NO. : 11,575,611 B2
APPLICATION NO. : 17/010396
DATED : February 7, 2023
INVENTOR(S) : Liu Page 1 of 1

It is certified that error appears in the above-identified patent and that said Letters Patent is hereby corrected as shown below:

In the Specification

Column 5, Detailed Description, Line 19:
After "and", insert --F'-- therefor

Column 5, Detailed Description, Line 23:
Delete "F" and insert --F'-- therefor

Column 5, Detailed Description, Line 26:
Delete "F)." and insert --F').-- therefor Signed and Sealed this
Twenty-third Day of April, 2024

Katherine Kelly Vidal
*Director of the United States Patent and Trademark Office*